United States Patent [19]

Lin

[11] Patent Number: 5,424,146

[45] Date of Patent: Jun. 13, 1995

[54] STORAGE BATTERY WITH A BATTERY HOUSING THAT PROVIDES PROTECTION AGAINST LEAKAGE

[75] Inventor: Yung-Hua Lin, Chia-Yi, Taiwan, Prov. of China

[73] Assignee: Cheng Kwang Storage Battery Co., Ltd., Chia-Yi, Taiwan, Prov. of China

[21] Appl. No.: 320,646

[22] Filed: Oct. 11, 1994

[51] Int. Cl.⁶ .................. H01M 2/02; H01M 2/12
[52] U.S. Cl. .................................. 429/84; 429/88; 429/175
[58] Field of Search .............. 429/84, 83, 87, 88, 429/175

[56] References Cited

U.S. PATENT DOCUMENTS

| | | | |
|---|---|---|---|
| 4,207,387 | 6/1980 | Jutte | 429/88 |
| 4,275,128 | 6/1981 | Sano | 429/88 |
| 5,278,003 | 1/1994 | Francisco | 429/175 |
| 5,281,492 | 1/1994 | Lin | 429/84 |

*Primary Examiner*—Anthony Skapars
*Attorney, Agent, or Firm*—Oblon, Spivak, McClelland, Maier & Neustadt

[57] ABSTRACT

A storage battery has a battery housing which includes a rectangular casing with an open top end and a plurality of cell compartments, and a cover device sealed to the open top end of the casing. The cover device includes a main cover part and a sub-cover part. The main cover part has a plate body with a top face that is formed with a plurality of adjacent rectangular chambers. Each of the chambers is aligned with a respective one of the cell compartments and is confined by first and second longitudinal walls and first and second transverse walls. Each of the chambers has a bottom formed with a vent hole, a return hole, and an upwardly projecting partition unit that confines a condensate groove in the chamber. The sub-cover part is sealed to the main cover part at top edges of the longitudinal and transverse walls and the partition unit of each of the chambers to seal a top end of the condensate groove in each of the chambers. The particular arrangement of the vent hole and the return hole, and the particular structure of the partition unit permit the formation of an air lock in each of the chambers when the storage battery has toppled to ensure that leakage of electrolyte out of the battery housing can be effectively minimized even when there are defects in the sealing of the sub-cover part to the main cover part.

4 Claims, 9 Drawing Sheets

STORAGE BATTERY WITH A BATTERY HOUSING THAT PROVIDES PROTECTION AGAINST LEAKAGE

BACKGROUND OF THE INVENTION

1. Field of the Invention

The invention relates to a storage battery, more particularly to a storage battery which has a battery housing with a cover device that offers added protection against leakage.

2. Description of the Related Art

A conventional storage battery comprises a battery housing which includes a casing for receiving cell plates and electrolyte therein, and a cover device for closing an open top end of the casing. In use, the heat that is generated during electrolysis causes the electrolyte to evaporate. The vaporized electrolyte is then released to the atmosphere via a vent hole in the cover device. Thus, there is a need to replenish the electrolyte in the battery housing periodically.

Figure 1:
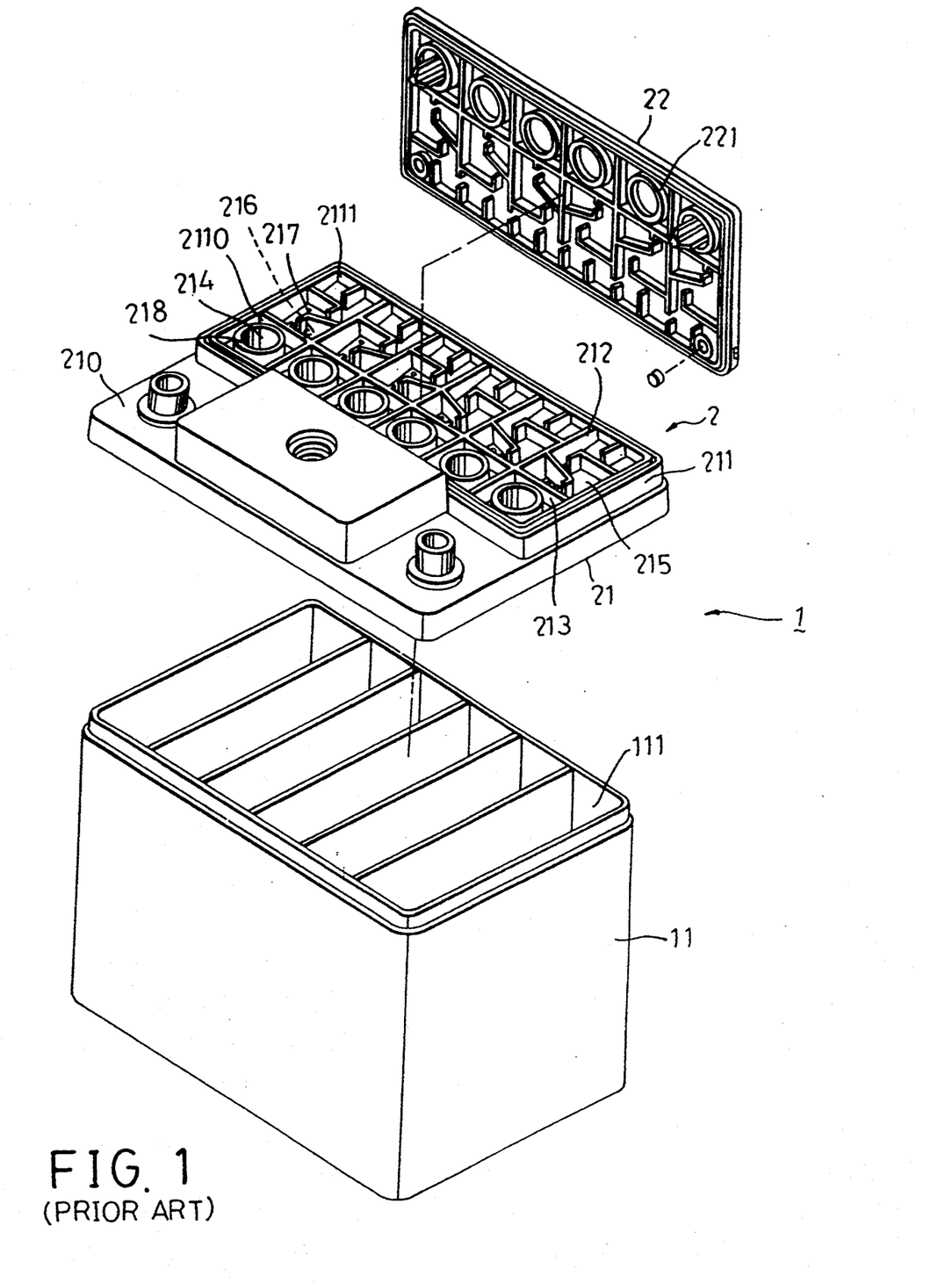
FIG. 1 is an exploded view of a battery housing of a conventional storage battery.

To overcome the above drawback, a battery housing with a cover device that is capable of recovering the vaporized electrolyte has been developed, thereby obviating the need for replenishing the electrolyte in the battery housing periodically. Referring to FIG. 1, the battery housing 1 comprises a rectangular casing 11 and a cover device 2 heat-sealed to an open top end of the casing 11. The cover device 2 includes a main cover part 21 and a sub-cover part 22. The main cover part 21 has a plate body 210 with a top face that is formed with a rectangular confining wall 211. The confining wall 211 is divided by a plurality of spaced transverse dividers 212 and a longitudinal divider 213 into a plurality of first and second chambers 2110, 2111. Each of the first chambers 2110 has a bottom formed with a fluid inlet 214 for pouring electrolyte into a respective cell compartment 111 of the casing 11. Each of a plurality of annular lips 218 projects upwardly from the plate body 210 and is disposed around a respective one of the fluid inlets 214. Each of the second chambers 2111 has a bottom which is formed with an upwardly projecting partition unit that confines a condensate groove 215 and which is further formed with a return hole 216 and a vent hole 217.

The sub-cover part 22 is secured integrally to the main cover part 21 after electrolyte has been poured into the cell compartments 111 via the fluid inlets 214. The sub-cover part 22 is heat-sealed to the main cover part 21 at top edges of the confining wall 211, the dividers 212, 213, and the partition units. The sub-cover part 22 thus seals a top end of the condensate grooves 215. The sub-cover part 22 further has a bottom face formed with a plurality of annular projections 221 which are heat-sealed to the annular lips 218, thereby closing the fluid inlets 214.

Figure 2:
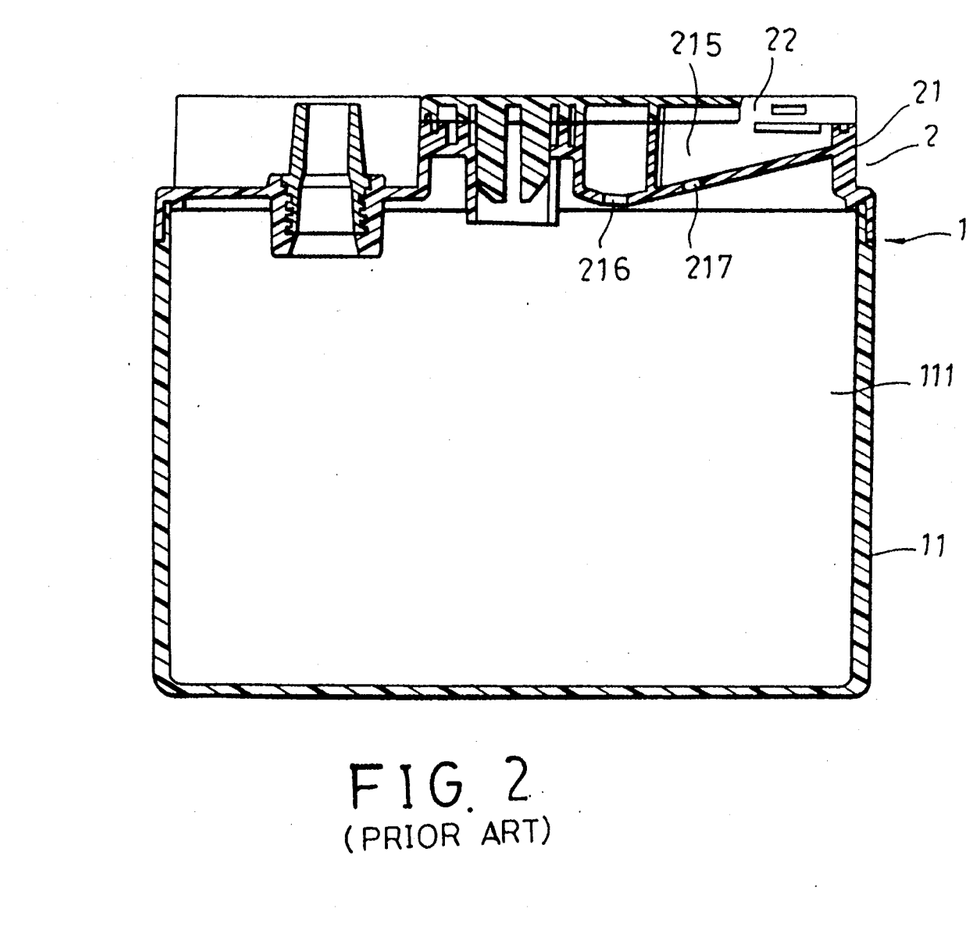
FIG. 2 is a sectional view illustrating the battery housing of the conventional storage battery when assembled.

Referring to FIG. 2, the condensate groove 215 in each of the second chambers 2111 is communicated fluidly with a respective one of the cell compartments 111 via the return hole 216 and the vent hole 217. When a storage battery which employs the battery housing 1 is in use, the electrolyte in the cell compartments 111 undergo electrolysis and evaporate due to the heat that is generated. The vaporized electrolyte flow into the condensate grooves 215 via the return holes 216 or the vent holes 217 and contact the bottom face of the sub-cover part 22. Since the sub-cover part 22 is exposed to the atmosphere, the temperature of the sub-cover part 22 is less than that of the vaporized electrolyte entering the condensate grooves 215. Thus, heat transfer occurs so that the vaporized electrolyte condenses, and the resulting condensate flows back into the corresponding cell compartment 111 via the return holes 216. Therefore, since the vaporized electrolyte is not released to the atmosphere and is instead recovered, there is no need to replenish the electrolyte in the battery housing 1 periodically.

It is noted that sealing of the sub-cover part 22 to the main cover part 21 has to be conducted with a high degree of precision in order to guard effectively against leakage. Otherwise, when transporting the storage battery, the electrolyte in the cell compartments 111 can flow easily into the condensate grooves 215 and leak out of the cover device 2 via crevices between the main cover part 21 and the subcover part 22 if the storage battery is in an abnormal position, e.g. toppled forward, backward or sideways.

SUMMARY OF THE INVENTION

The object of the present invention is to provide a storage battery housing which has an improved cover device that ensures little or no leakage of electrolyte will occur even when there are defects in the sealing of the sub-cover part to the main cover part.

More specifically, the object of the present invention is to provide a storage battery housing with a cover device which employs an air lock therein to safeguard against leakage of electrolyte.

Accordingly, the storage battery of the present invention comprises a battery housing which includes a rectangular casing with an open top end and a plurality of cell compartments, and a cover device sealed to the open top end of the casing. The cover device includes a main cover part and a sub-cover part. The main cover part has a plate body with a top face that is formed with a plurality of adjacent rectangular chambers. Each of the chambers is aligned with a respective one of the cell compartments and is confined by first and second longitudinal walls and first and second transverse walls. Each of the chambers has a bottom formed with a vent hole, a return hole, and an upwardly projecting partition unit that confines a condensate groove in the chamber. The sub-cover part is sealed to the main cover part at top edges of the longitudinal and transverse walls and the partition unit of each of the chambers to seal a top end of the condensate groove in each of the chambers.

The partition unit in each of the chambers includes a first partition plate which extends perpendicularly from the second longitudinal wall toward the first longitudinal wall, and a second partition plate which is connected perpendicularly to the first partition plate. The first and second partition plates cooperate with the second longitudinal wall and the second transverse wall to form a space thereamong. The vent hole and the return hole are confined within the space. The second partition plate has a first distal end which forms a first clearance with the second transverse wall and a second distal end. The partition unit further includes a third partition plate which extends perpendicularly from the second transverse wall toward the first transverse wall and which is disposed between the second partition plate and the first longitudinal wall. The third partition plate has a distal end which extends beyond the second distal end of the second partition plate. The partition unit further includes a fourth partition plate which is connected perpendicularly to the distal end of the third partition plate and which is parallel to the first transverse wall. The fourth partition plate has an end portion which extends toward the second longitudinal wall and which has a bent section that extends perpendicularly toward the first partition plate. The bent section has a distal end that forms a second clearance with the first partition plate. The second distal end of the second partition plate forms a third clearance with the fourth partition plate.

The vent hole is disposed adjacent to the first and second partition plates. The return hole is disposed closer to the second longitudinal wall and the second transverse wall when compared to the vent hole.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 3:
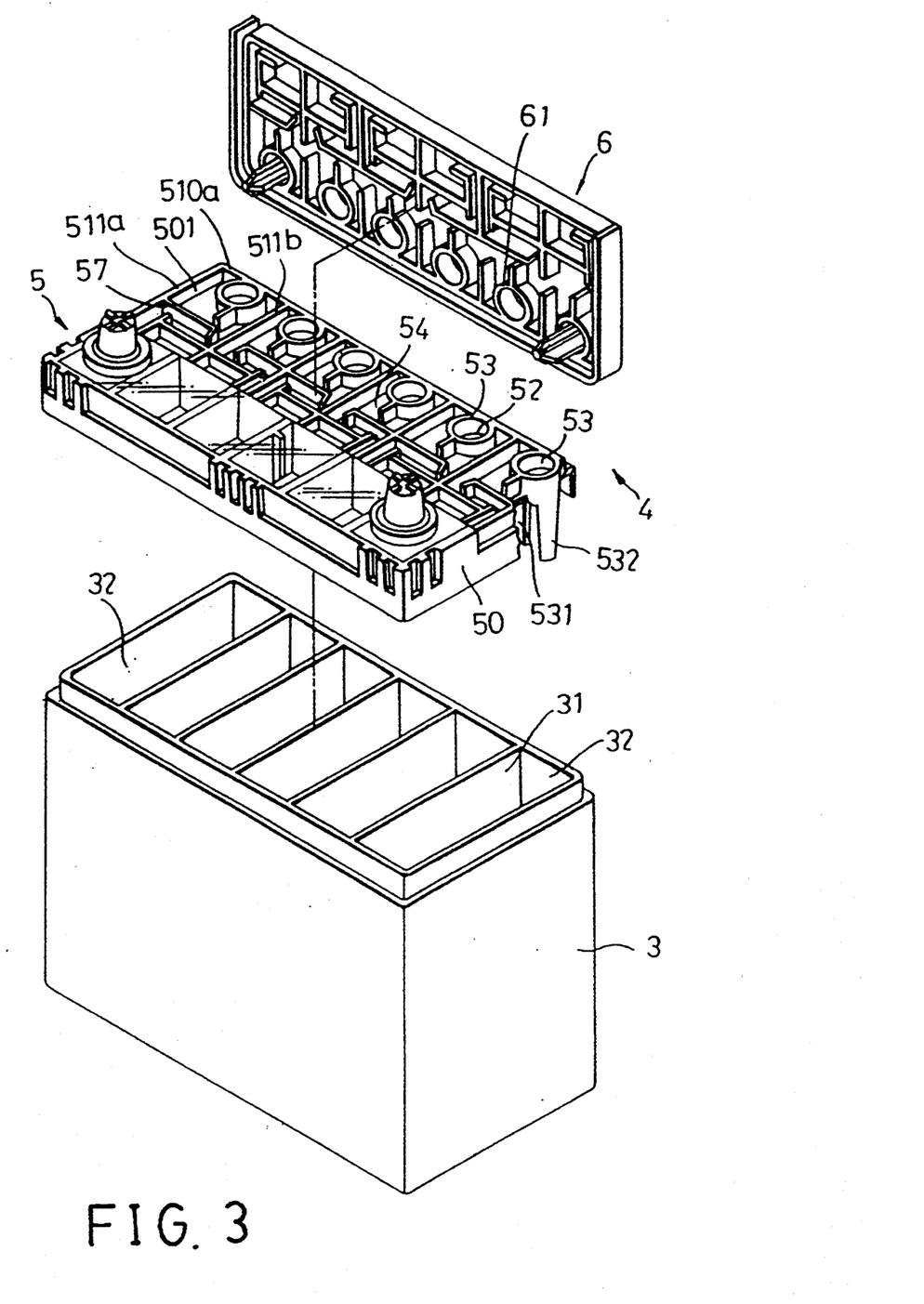
FIG. 3 is an exploded view of the battery housing of the preferred embodiment of a storage battery in accordance with the present invention.
Figure 4:
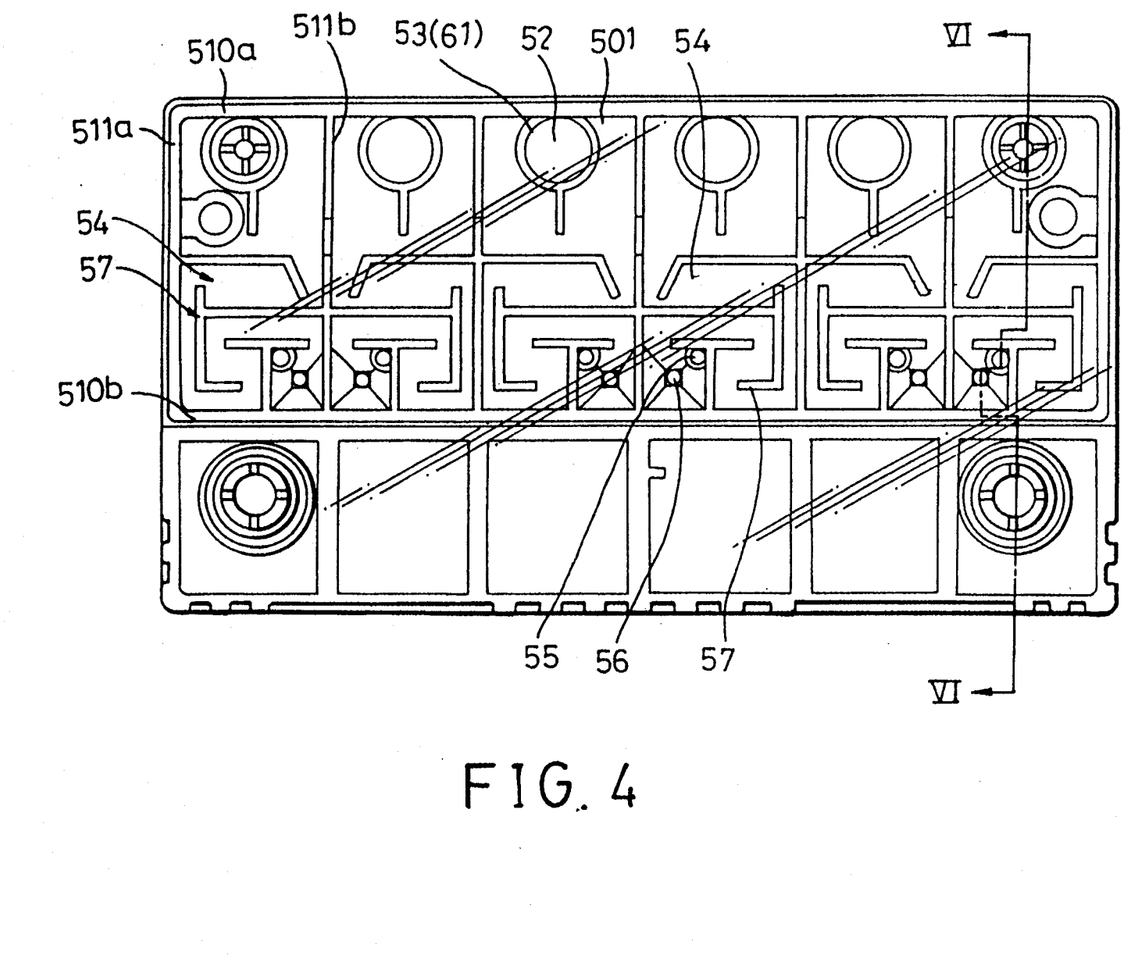
FIG. 4 is a top view of the preferred embodiment.

Referring to FIGS. 3 and 4, the preferred embodiment of a storage battery according to the present invention is shown to comprise a battery housing which includes a rectangular casing 3 and a cover device 4 heat-sealed to an open top end of the casing 3. The casing 3 confines an interior which is divided by a plurality of dividers 31 into a plurality of cell compartments 32. The cover device 4 comprises a main cover part 5 and a sub-cover part 6. The main cover part 5 has a plate body 50 with a top face that is formed with a plurality of adjacent rectangular chambers 501, each of which is aligned with a respective one of the cell compartments 32 and is confined by first and second longitudinal walls 510a, 510b and first and second transverse walls 511a, 511b. Each of the chambers 501 has a bottom formed with a fluid inlet 52 for pouring electrolyte into the respective cell compartment 32, and an upwardly projecting annular lip 53 around the fluid inlet 52. The bottom of each chamber 501 is further formed with a vent hole 55, a return hole 56, and an upwardly projecting partition unit 57 that confines a condensate groove 54 in the chamber 501.

The sub-cover part 6 is secured integrally to the main cover part 5 after electrolyte has been poured into the cell compartments 32 via the fluid inlets 52. The sub-cover part 6 is heat-sealed to the main cover part 5 at top edges of the walls 510a, 510b, 511a, 511b and the partition unit 57 of each of the chambers 501. The sub-cover part 6 thus seals a top end of the condensate groove 54 in each of the chambers 501. The sub-cover part 6 further has a bottom face formed with a plurality of annular projections 61 which are heat-sealed to the annular lips 53, thereby closing the fluid inlets 52.

Figure 5:
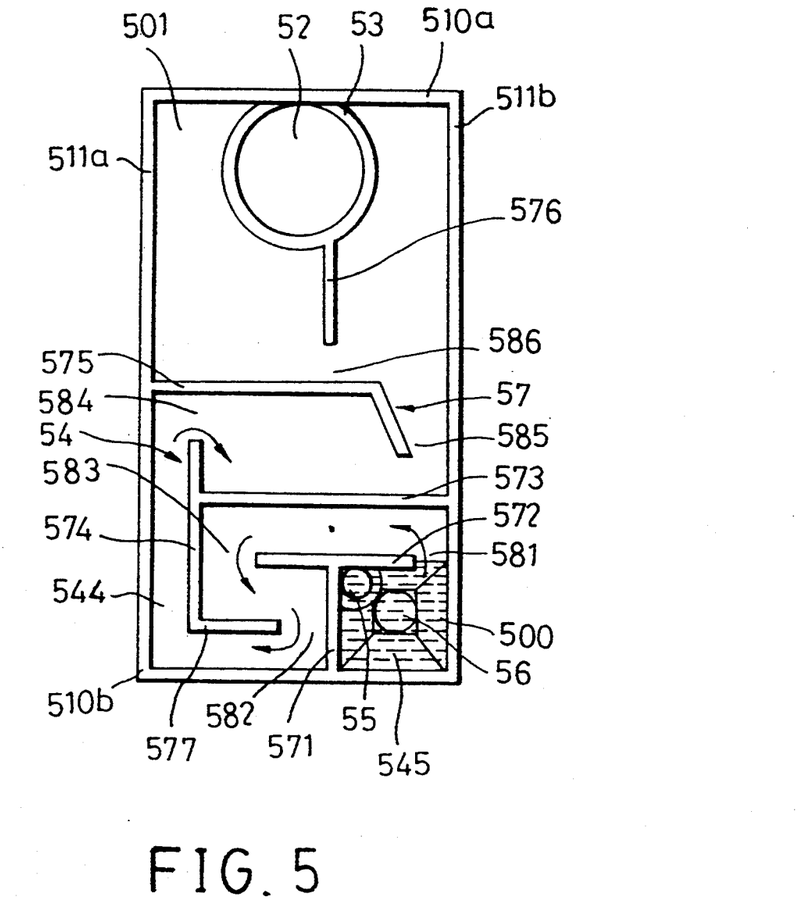
FIG. 5 is an enlarged view which illustrates a chamber of the cover device of the battery housing of the preferred embodiment.

Referring to FIGS. 4 and 5, it is noted that the chambers 501 can be grouped into adjacent pairs such that the partition units 57 in the adjacent pair of chambers 501 are symmetrical with respect to a common transverse wall 511b. The partition units 57 of the adjacent pair of chambers 501 can also be formed such that they extend in identical directions, although forming the partition units 57 of the adjacent pair of chambers 501 in a symmetrical manner would facilitate forming of the same.

The partition unit 57 in each of the chambers 501 includes a first partition plate 571 which extends perpendicularly from the second longitudinal wall 510b toward the first longitudinal wall 510a, and a second partition plate 572 which is connected perpendicularly to the first partition plate 571. The first and second partition plates 571, 572 cooperate with the second longitudinal wall 510b and the second transverse wall 511b to form a space 500 thereamong. The vent hole 55 and the return hole 56 are confined within the space 500. One of the distal ends of the second partition plate 572 forms a first clearance 581 with the second transverse wall 511b. A third partition plate 573 extends perpendicularly from the second transverse wall 511b toward the first transverse wall 511a and is disposed between the second partition plate 572 and the first longitudinal wall 510a. The third partition plate 573 has a distal end which extends beyond the other one of the distal ends of the second partition plate 572. A fourth partition plate 574 is connected perpendicularly to the distal end of the third partition plate 573 and is parallel to the first transverse wall 511a. The fourth partition plate 574 has a first end portion which extends toward the second longitudinal wall 510b and which has a bent section 577 that extends perpendicularly toward the first partition plate 571. The distal end of the bent section 577 forms a second clearance 582 with the first partition plate 571. The other one of the distal ends of the second partition plate 572 forms a third clearance 583 with the fourth partition plate 574. A fifth partition plate 575 extends perpendicularly from the first transverse wall 511a toward the second transverse wall 511b and is disposed between the third partition plate 573 and the first longitudinal wall 510a. The fluid inlet 52 and the annular lip 53 are disposed adjacent to the first longitudinal wall 510a, and a sixth partition plate 576 extends radially from the annular lip 53 toward the fifth partition plate 575. The fourth partition plate 574 has a second end portion which forms a fourth clearance 584 with the fifth partition plate 575. The fifth partition plate 575 has a distal end which forms a fifth clearance 585 with the second transverse wall 511b. The sixth partition plate 576 has a distal end which forms a sixth clearance 586 with the fifth partition plate 575.

In this embodiment, the vent hole 55 is disposed adjacent to the first and second partition plates 571, 572, while the return hole 56 is disposed closer to the second longitudinal wall 510b and the second transverse wall 511b when compared to the vent hole 55.

Figure 6:
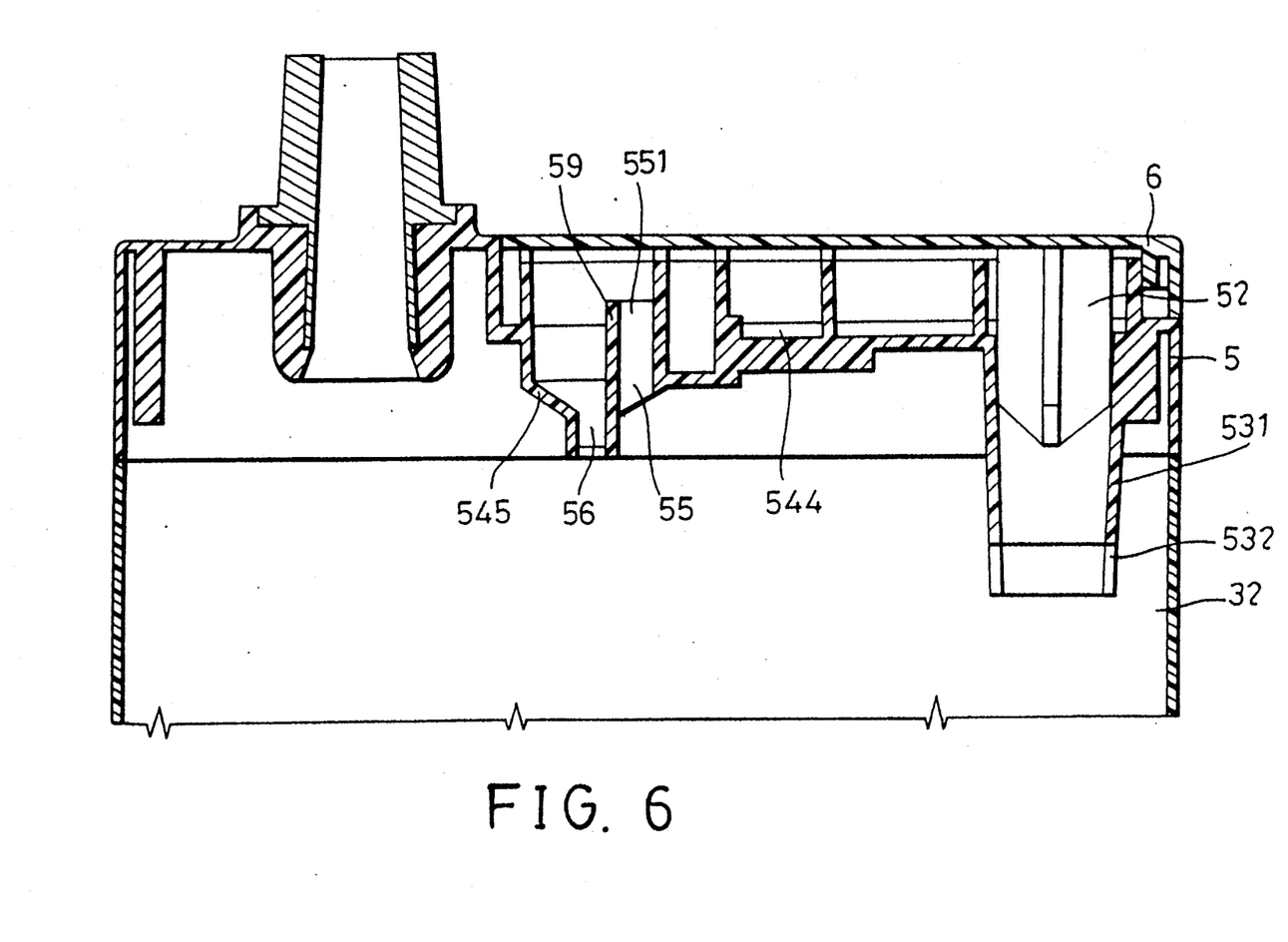
FIG. 6 is a sectional view of the preferred embodiment, taken along line VI—VI in FIG. 4.

Referring to FIGS. 4 to 6, in order to facilitate the return of condensate into the casing 3, the condensate groove 54 has a bottom 544 which inclines gradually and upwardly therealong from the first clearance 581 to the sixth clearance 586. The space 500 further has a bottom with four downwardly inclining faces 545 that converge at the return hole 56. The bottom of the space 500 further has an upwardly projecting stub 59 formed thereat. The stub 59 has a distal end which is spaced from the sub-cover part 6, and has the vent hole 55 formed therethrough. Thus, the open top end 551 of the vent hole 55 is disposed above the return hole 56.

To facilitate the provision of a proper amount of electrolyte in each of the cell compartments 32, each annular lip 53 is formed with a spaced pair of indicating rods 531, 532 that have different lengths and that extend downwardly into a respective one of the cell compartments 32. When filling each of the cell compartments 32 with electrolyte, electrolyte is added to the casing 3 via the fluid inlets 52 until the tip of a longer one 532 of the indicating rods extends into the electrolyte. An excess amount of electrolyte in the cell compartment 32 is detected when the tip of a corresponding shorter one 531 of the indicating rods extends into the electrolyte.

Referring to FIGS. 5 and 6, when the storage battery of the present invention is in use, the electrolyte in the cell compartments 32 undergo electrolysis and evaporate due to the heat that is generated. The vaporized electrolyte flow into the spaces 500 via the vent holes 55 and then flow along the condensate grooves 54 for cooling. The condensate that is produced is guided by the bottom 544 of the condensate grooves 50 to flow to the corresponding cell compartment 32 via the return holes 56. The open top end 551 of the vent hole 55 is disposed above the return hole 56 to enable the vaporized electrolyte to flow into the condensate grooves 54 via the vent holes and to enable the resulting condensate to flow back into the cell compartments 32 via the return holes 56, thereby ensuring that the heat-transfer cycle can be efficiently conducted.

In the event that the storage battery has toppled forward during transport, and crevices are present at junctions of the sub-cover part 6 and the main cover part 5, the electrolyte in the cell compartments 32 flow into the spaces 500 in the chambers 501. When the spaces 500 are filled with electrolyte and the vent holes 55 and the return holes 56 are submerged in electrolyte, air in the condensate grooves 54 are unable to flow into the cell compartments 32. Thus, electrolyte cease to flow out of the cell compartments 32, thereby forming an air lock which ensures that leakage of electrolyte will occur only when defects in the sealing of the sub-cover part 6 to the main cover part 5 are present in the vicinity of the spaces 500. The electrolyte in the spaces 500 flow back into the cell compartments 32 when the storage battery is restored to its normal upright position.

Figure 7:
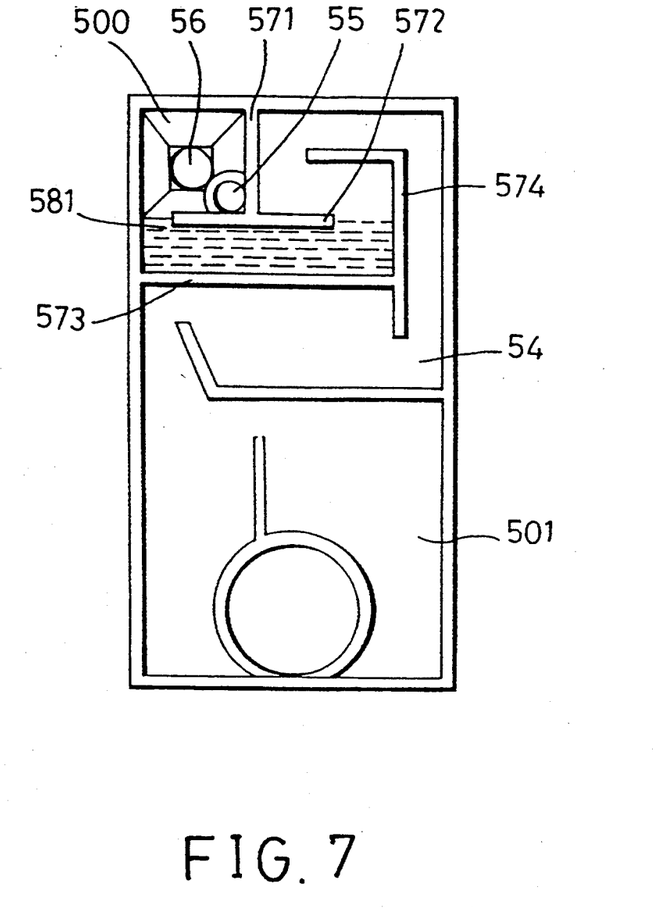
FIG. 7 illustrates the chamber of the cover device when the preferred embodiment has toppled rearward.

Referring to FIGS. 6 and 7, in the event that the storage battery has toppled rearward during transport, the electrolyte in the cell compartments 32 flow into the chambers 501 past the first clearances 581 and into a space between the second and third partition plates 572, 573. Eventually, the level of electrolyte in the condensate grooves 54 reaches that of the second partition plates 572, thereby blocking air communication between the spaces 500 and the remaining part of the condensate grooves 54. At this stage, air in the remaining part of the condensate grooves 54 are unable to flow into the cell compartments 32, thereby forming an air lock to cut off the flow of electrolyte out of the cell compartments 32.

Figure 8:
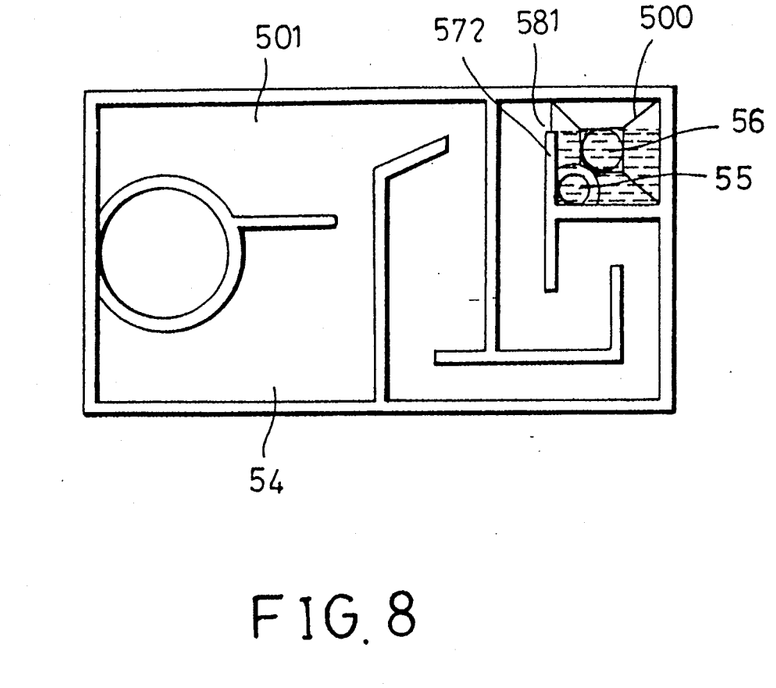
FIG. 8 illustrates the chamber of the cover device when the preferred embodiment has toppled to the left.
Figure 9:
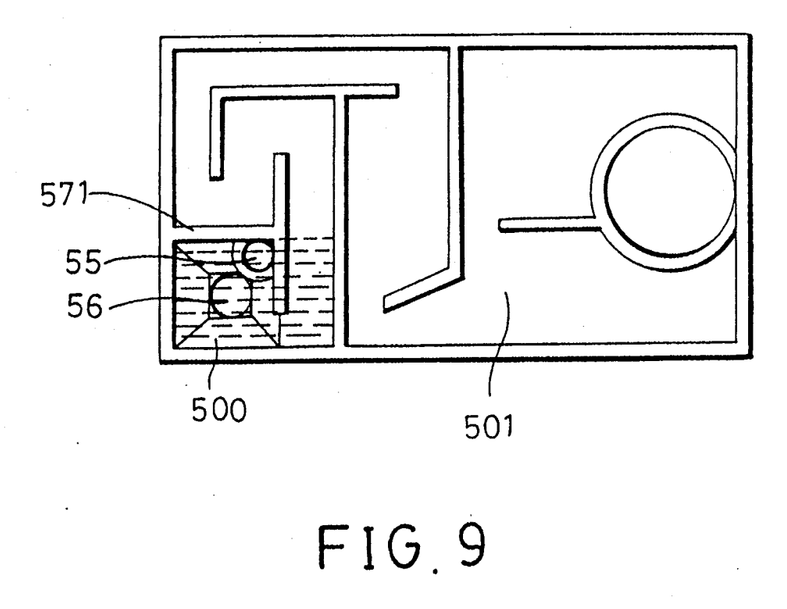
FIG. 9 illustrates the chamber of the cover device when the preferred embodiment has toppled to the right.

FIG. 8 illustrates the chamber 501 when the storage battery has toppled to the left, while FIG. 9 illustrates the chamber 501 when the storage battery has toppled to the right. In both cases, the electrolyte in the cell compartments 32 flow into the spaces 500 in the chambers 501 until the vent holes 55 and the return holes 56 are submerged in electrolyte. At this stage, air in the condensate grooves 54 are unable to flow into the cell compartments 32, thereby forming an air lock to cut off the flow of electrolyte out of the cell compartments 32.

It has thus been shown that an air lock is formed in each of the chambers 501 regardless of the direction the storage battery of the present invention has toppled. It is noted that air locking is possible in each of the chambers 501 due to the unique arrangement of the vent holes 55 and the return holes, and due to the particular structures of the first, second, third and fourth partition plates 571, 572, 573, 574. The fifth and sixth partition plates 575, 576 serve to lengthen the condensate grooves 54 to increase the heat transfer area so as to increase correspondingly the heat transfer efficiency.

Due to the formation of an air lock in each of the chambers 501 of the cover device 4 when the storage battery of the present invention has toppled, leakage of electrolyte out of the battery housing can be effectively minimized even when there are defects in the sealing of the sub-cover part 6 to the main cover part 5. The features and objects of the present invention are thus achieved.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A storage battery comprising a battery housing which includes a rectangular casing with an open top end and a plurality of cell compartments, and a cover device sealed to said open top end of said casing, said cover device including a main cover part and a sub-cover part, said main cover part having a plate body with a top face that is formed with a plurality of adjacent rectangular chambers, each of said chambers being aligned with a respective one of said cell compartments and being confined by first and second longitudinal walls and first and second transverse walls, each of said chambers having a bottom formed with a vent hole, a return hole, and an upwardly projecting partition unit that confines a condensate groove in said chamber, said sub-cover part being sealed to said main cover part at top edges of said longitudinal and transverse walls and said partition unit of each of said chambers to seal a top end of said condensate groove in each of said chambers, wherein:

said partition unit in each of said chambers includes a first partition plate which extends perpendicularly from said second longitudinal wall toward said first longitudinal wall, and a second partition plate which is connected perpendicularly to said first partition plate, said first and second partition plates cooperating with said second longitudinal wall and said second transverse wall to form a space thereamong, said vent hole and said return hole being confined within said space, said second partition plate having a first distal end which forms a first clearance with said second transverse wall and a second distal end, said partition unit further including a third partition plate which extends perpendicularly from said second transverse wall toward said first transverse wall and which is disposed between said second partition plate and said first longitudinal wall, said third partition plate having a distal end which extends beyond said second distal end of said second partition plate, said partition unit further including a fourth partition plate which is connected perpendicularly to said distal end of said third partition plate and which is parallel to said first transverse wall, said fourth partition plate having an end portion which extends toward said second longitudinal wall and which has a bent section that extends perpendicularly toward said first partition plate, said bent section having a distal end that forms a second clearance with said first partition plate, said second distal end of said second partition plate forming a third clearance with said fourth partition plate; and said vent hole is disposed adjacent to said first and second partition plates, said return hole being disposed closer to said second longitudinal wall and said second transverse wall when compared to said vent hole.

2. The storage battery as claimed in claim 1, wherein said space has a bottom with at least one downwardly inclining face which converges at said return hole, said bottom further having an upwardly projecting stub which has a distal end that is spaced from said subcover part and which has said vent hole formed therethrough, said vent hole having an open top end disposed above said return hole.

3. The storage battery as claimed in claim 2, wherein said condensate groove has a bottom which inclines gradually and upwardly therealong from said first clearance to said third clearance.

4. The storage battery as claimed in claim 1, wherein said bottom of each of said chambers is further formed with a fluid inlet and an upwardly projecting annular lip around said fluid inlet, said sub-cover part further having a bottom face formed with a plurality of annular projections, each of which being sealed to said annular lip in a respective one of said chambers to close said fluid inlet, each said annular lip being formed with a spaced pair of indicating rods that have different lengths and that extend downwardly into a respective one of said cell compartments.

* * * * *